Figure 2:
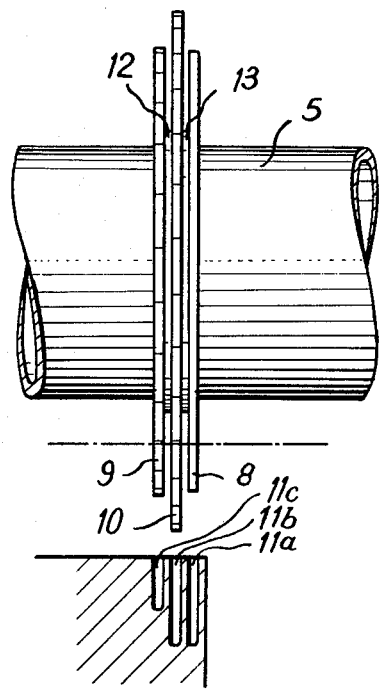

July 12, 1966  P. A. CHIFFOLOT ETAL  3,260,158
METHOD OF AND MACHINE FOR CUTTING RECTILINEAR FLANGES
Filed Nov. 3, 1964  2 Sheets-Sheet 1

INVENTORS
PIERRE ALBERT CHIFFOLOT
JEAN GEORGES LOUIS DESNOYERS
BY
Bacon & Thomas
ATTORNEYS July 12, 1966  P. A. CHIFFOLOT ETAL  3,260,158
METHOD OF AND MACHINE FOR CUTTING RECTILINEAR FLANGES
Filed Nov. 3, 1964  2 Sheets-Sheet 2

INVENTORS
PIERRE ALBERT CHIFFOLOT
JEAN GEORGES LOUIS DESNOYERS
BY
Bacon & Thomas
ATTORNEYS United States Patent Office 3,260,158
Patented July 12, 1966

3,260,158
METHOD OF AND MACHINE FOR CUTTING RECTILINEAR FLANGES
Pierre Albert Chiffolot, Colombes, and Jean Georges Louis Desnoyers, Chatoux, France, assignors to Commissariat a l'Energie Atomique, Paris, France
Filed Nov. 3, 1964, Ser. No. 408,523
Claims priority, application France, Nov. 20, 1963, 954,357
2 Claims. (Cl. 90—11)

The present invention has for an object a method and machine for cutting rectilinear flanges of rectangular section in a metallic workpiece.

Various industrial requirements are known for manufacturing metal workpieces with flanges which are cut on the surface. This applies for example to certain sheaths for fuel elements for nuclear reactors, on which the sectors defined by longitudinal grooves must have, for the purpose of cooling said elements, flanges in various forms, the direction of which is generally reversed from one sector to the next in order to form a chevron pattern.

The sheaths are generally manufactured from rough shapes of an alloy suitable for this purpose, such, for example, as a magnesium-zirconium, these rough shapes being shaped into their external cylindrical or polygonal form and divided into sectors defined by the longitudinal grooves aforesaid, previous to the cutting of the flanges.

The form given to the flanges varies according to requirements: it may be rectilinear or curvilinear at the base of the grooves, their section being of rectangular form.

The cutting of the flanges consists in machining grooves in the sectors of the workpiece, these grooves being defined by the adjacent flanges.

Various processes have already been suggested for said cutting, endeavouring to find, on the one hand, a rapid and precise industrial operation and, on the other hand, a method which can bring about this operation with a minimum heating of the metal and small lateral pressure not causing any deformation of the flanges nor any structural instability in the metal.

Various manufacturing problems have been solved particularly for the production of a large number of very thin flanges of rectangular section counted in a transverse section of a sheath, as well as for giving said thin flanges a favourable inclination of their parallel median planes with respect to a radial plane of the sheath.

The method and apparatus forming the subject of the present invention allow these problems to be resolved, particularly with regard to cutting a large number of very thin, rectilinear flanges with or without the inclination referred to, in a very rapid manner, if desired with simultaneously milling of a plurality of sheaths, with great precision and without deformation of the flanges despite their small thickness which may be even smaller than one millimetre.

The invention consists in a method of cutting rectilinear flanges of rectangular section in a metal workpiece, which method comprises mounting two milling saw-cutters on at least one rotatable shaft with a fixed axis, and perpendicularly thereto, together with a member for supporting a flange during milling of the flange adjacent thereto, said three members being spaced by a distance equal to thickness of one flange, the first one of said saw-cutters adjacent said supporting member having a diameter corresponding to the depth of a groove to be cut, the second of said saw-cutters, adjacent said first saw-cutter and said supporting member having a smaller diameter; locating at least one workpiece so as to be movable in a direction perpendicular to the axis of said rotatable shaft and also movable step by step in the direction of its own axis, said axis forming with the median planes of said milling saw-cutters an angle equal to the inclination of the flanges, and also movable in the direction of the grooves to be cut; cutting a first groove by means of the said milling cutter with the smallest diameter by shifting the workpiece in the direction of the groove; shifting the workpiece in the direction of its axis by a distance equal to the distance separating the two median planes of two adjacent grooves; then cutting the first groove, which is already partially machined, by means of the said milling cutter with the largest diameter; cutting a second groove by means of the other milling cutter and so on, up to the completion of all the grooves to be cut on a first sector, said flange-supporting member being engaged in the adjacent groove, during the cutting of the adjacent groove to its final depth, the same operations being carried out on the other sectors for forming flanges of the same direction; and effecting the same operations on the other sectors for forming flanges of opposite direction, in order to form a chevron pattern after having reversed the inclination of the axis of the workpiece with the median planes of the said milling saw-cutters.

The invention also consists in apparatus for carrying out this method, and connected to a milling machine having at least one shaft rotatable about a fixed horizontal axis, is characterised in that it comprises, in combination, a smooth disc and two milling saw-cutters fixed on said rotatable shaft perpendicularly to its axis with the interposition of struts having a thickness equal to that of a flange, the first milling saw-cutter adjacent the disc, having a diameter corresponding to the depth of a groove to be cut, the second milling saw-cutter, adjacent the first and the disc, having a diameter which is substantially equal and corresponds to about one half the depth of a groove; a copying table arranged horizontally beneath the rotatable shaft for supporting at least one workpiece and movable vertically, the workpiece being fixed on said table at an angular position such that the flanges to be made are radial or inclined; a second table resting on the table of the milling machine and supporting the copying table, said second table being movable step by step in the direction of the axis of the workpiece, the copying table, the second table and the table of the milling machine being connected in such a way that the axis of the workpiece forms with the vertical plane containing the axis of the rotatable shaft an angle which is equal to the angle of inclination on the axis of the workpiece of the flanges to be cut, and the table of the milling machine being movable in the direction of the grooves to be cut; and means for automatically operating the raising and lowering of the copying table, the movement step by step of the second table, the said longitudinal movement of the table of the milling machine, i.e. parallel to the plane of the milling cutters, and the reproduction by means of a template of rectilinear or curvilinear form, of the base of each of the grooves.

Figure 1:
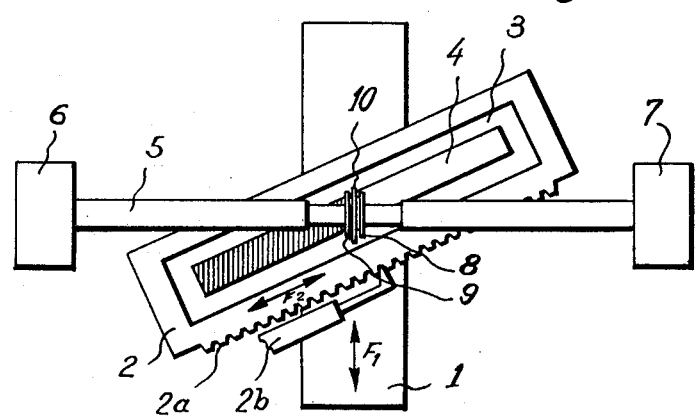
Figure 3:
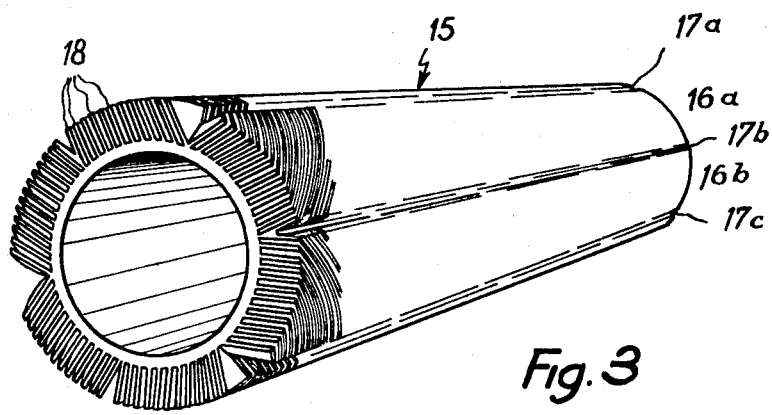
Figure 4:
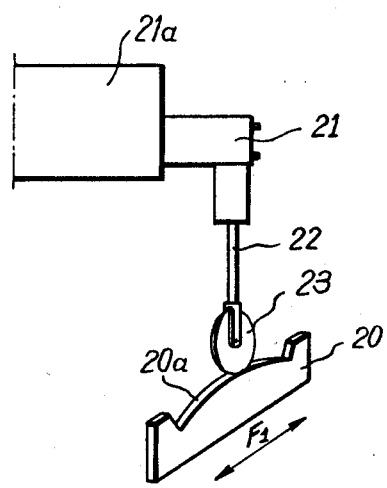

In order that the invention may be more clearly understood, reference will now be made to the accompanying drawings which show one embodiment of apparatus for putting the method thereof into effect, and in which:

FIGURE 1 is a diagrammatic and partial view in plan of an apparatus according to the invention, the reproducing device not being shown, for the purpose of simplification, FIGURE 2 is an elevational view on a large scale of one part of said apparatus, showing the rotatable shaft fitted with its cutting means opposite the workpiece, shown after the third pass has been carried out, FIGURE 3 is a view in perspective of the machined workpiece, and FIGURE 4 is a perspective view of the reproducing member to which are attached automatic controlling means for the milling machine.

Referring to the drawings, the apparatus, as shown on FIGURE 1, comprises essentially: a first horizontal table 1 of a milling machine of any known type, of which the other usual constitutent parts have not been shown, so as not to complicate the drawing, said table being movable in the direction of the double arrow F1 in the known way for milling machine tables; a second horizontal table 2, held by the table 1 and orientable with respect to said latter, the table 2 being of the type having means for moving in the direction of the double arrow F2, for example, a toothed rack 2a controlled by a device with a pneumatic jack 2b; a third horizontal table 3 of the copying table type, held by the table 2 and movable vertically under the action of control means of any known type, said table 3 having a support in which is fixed the workpiece 4.

Above the workpiece 4 is arranged a rotatable shaft 5 carried by two bearings 6 and 7 secured to or integral with the frame (not shown) of the milling machine; one of said bearings comprises a means for rotating the shaft 5.

The shaft 5 has, towards its median part, a disc 8 and two milling saw-cutters 9 and 10 which may be seen more easily on FIGURE 2.

The cutters 9 and 10 are effectively circular milling saws with large teeth having a large cut for use on light alloys; their general thickness corresponds to the size of the grooves 11a, 11b, 11c to be cut; the cutter 9 has a smaller diameter than that of cutter 10 in such a way that during the functioning of the machine, the cutter 9 cuts a groove of about one half the height of a flange, while the cutter 10 cuts a groove having the height of a flange.

The disc 8 is a smooth and polished disc with a diameter no larger than that of the cutter 9 and having a thickness very slightly smaller than the size of the groove.

The disc 8 and the cutters 9 and 10 are fixed on the shaft 5 perpendicularly to its axis with the interposition of two struts 12 and 13 of a thickness equal to that of a flange.

The operation of the milling machine is essentially as follows: the table 2 is orientated in order that, during the movement of the table 1 in the direction of the arrow F1, the grooves cut in the workpiece 4 form with the axis of said workpiece the desired angle of inclination, for example 25°; the workpiece 4 is fixed on its support integral with the table 3 and it is adjusted in position by pivoting about its axis to obtain, during cutting, the desired angle, for example 15°, between the axis of symmetry of the sheath and the vertical of the machine.

The shaft 5 is turned and the table 3 is raised; the cutter 9 then cuts the whole length a first groove but only half the depth at one of the ends of the workpiece by reason of the movement of the table 1; when table 3 is lowered, the table 2 is moved in the direction of the arrow F2 opposite said end by a distance equal to the distance between the axes of two adjacent grooves measured along the axis of the workpiece; when table 3 rises again the cutter 10 finishes the depth cutting of the first groove, while the cutter 9 cuts half the depth of a second groove, and so on. There are thus obtained flanges which are shown in FIGURE 3, by way of example, on a sheath 15 comprising sectors 16a, 16b, etc., separated by grooves 17a, 17b, 17c etc. The rectilinear flanges 18 form a chevron pattern from one sector to the other.

During said cuttings, the disc 8 penetrates into the adjacent groove of the groove during cutting by the cutter 10; it then supports the walls of the groove which it partially occupies, in such a way that the flange separating the groove during finishing the cutting and the adjacent groove occupied by the disc is supported by it and does not distort in order to reduce the friction effects of the disc on the walls of the groove in which it turns and to avoid the adhesion of cuttings, it is advantageous to vulcanise the disc.

During the cutting operations, the removal of the cuttings and cooling are ensured by any known means (not shown), for example by jets of compressed air suitable arranged for this purpose.

All the various movements for shifting the three tables are automatically controlled by any known means.

However, for maintaining a constant thickness of metal between the internal bore of the workpiece, which is the case of a sheath, and the base of a groove, automatic control has been provided to control a reproducing member, shown diagrammatically in FIGURE 4.

Said member comprises a template 20, located in a vertical plane parallel to that of the milling cutters, with a profile 20a identical with that of the base of the groove of the workpiece rendered integral by sliding connections of the copying table 3 in its vertical shifting and of the table 1 in its shifting along F1, a circular feeler 23 of the same diameter as the cutter 10, located in the plane of the template, mounted at the end of a rod 22 with small vertical displacement, of the order of one tenth of a millimetre, connected to a support-distributor 21 integral with the frame 21a of the milling machine.

The operation of this reproducing organ, given here by way of example, is as follows: when the table 1 is moved along F1, the contact of the feeler with the template detects any variations in section, which are transmitted by means of the distributor 21 and by any other known means to the table 3 which is thus moved vertically in order to maintain the feeler and the template in contact.

A controlling device on the distributor allows the locking of the table 3 into a low position during the return of the machine cycle, while the sliding connections hereinabove mentioned allow the holding of the template in the plane of the feeler during the movement of tables 2 and 3 along F2.

We claim:

1. A method of cutting rectilinear flanges of rectangular section in a metal workpiece, said method comprising the steps of mounting two milling cutters on at least one rotatable shaft with a fixed axis, perpendicularly thereto, together with a member for supporting a flange during the milling of the flange adjacent thereto, said three members being spaced by a distance equal to the thickness of one flange, the first one of said saw-cutters adjacent said supporting member having a diameter corresponding to the depth of a groove to be cut, the second one of said saw-cutters adjacent said first saw-cutter and said supporting member having a smaller diameter; locating at least one workpiece so as to be movable in a direction perpendicular to the axis of said rotatable shaft, and also so as to be movable step by step in the direction of the axis of said workpiece, said axis forming with the median planes of said milling saw-cutters, an angle equal to the inclination of the flanges, and also movable in the direction of the flanges to be cut; cutting a first groove by means of said milling cutter having a smaller diameter by shifting said workpiece in the direction of said groove; shifting said workpiece in the direction of its axis by a distance equal to the distance separating two median planes of two adjacent grooves; cutting the first groove which is already partially machined, by means of said milling cutter having the larger diameter cutting a second groove by means of said other one of said milling cutters and so on, until the completion of all the grooves to be cut on a first sector, the said flange-supporting member being engaged in the adjacent groove, during the cutting of the adjacent groove to its final depth; carrying out the same operations on the other sectors for forming flanges in the same direction; and effecting the same operations on the other sectors for forming flanges of opposite directions in order to form a chevron pattern, after reversing the inclination of the axis of said workpiece with the median plane of the said milling saw-cutters.

2. Apparatus for cutting rectilinear flanges of rectangular section in a metal workpiece, said apparatus being in operative connection with a milling machine having at least one rotatable shaft mounted on a fixed horizontal axis, said apparatus comprising in combination a smooth disc and two milling-cutters fixed on said rotatable shaft perpendicularly to its axis, struts located between said cutters and said shaft, said struts having a thickness equal to that of a flange, the first milling saw-cutter adjacent said disc having a diameter corresponding to the depth of a groove to be cut, the second milling saw-cutter adjacent said first cutter and said disc having a diameter which is substantially equal to and corresponding to about half of the depth of a groove; a copying table arranged horizontally beneath said rotatable shaft for supporting at least one workpiece and movable vertically, the workpiece being fixed on said table at an angular position, such that the flanges to be made are radial or inclined; a second table resting on said table of said milling machine and supporting said copying table, means for moving said second table step by step in the direction of the axis of the workpiece, means for connecting said copying table, said second table and said table of said milling machine together in such a way that the axis of said workpiece forms with the vertical plane containing the axis of said rotatable shaft an angle which is equal to the angle of inclination on the axis of the piece of the flanges to be cut, and means for moving said table of said milling machine in the direction of the grooves to be cut; and means for automatically controlling the raising and lowering of said copying table, the step-by-step movement of said second table, the said longitudinal movement of said table of said milling machine, and the reproduction by means of a template of rectilinear or curvilinear form, of the base of each of the grooves.

No references cited.

WILLIAM W. DYER, JR., *Primary Examiner.*

G. A. DOST, *Assistant Examiner.*